Patented May 11, 1943

2,319,022

UNITED STATES PATENT OFFICE 2,319,022

PROCESS FOR MAKING AN OIL MODIFIED ALKYD RESIN

William A. Waldie, Dayton, Ohio, assignor to New Wrinkle, Inc., Dayton, Ohio, a corporation of Delaware No Drawing. Application August 12, 1940, Serial No. 352,273

5 Claims. (Cl. 260—22)

This invention relates to a synthetic resin composition and its method of manufacture. The resinous composition of this invention is of the alkyd type and is particularly adapted for use in compounding coating compositions which can be applied to a base and baked to produce a hard, tough film which has enhanced adherent properties, especially on metal.

Synthetic resins of the alkyd type have heretofore been made from polyhydric alcohols, such as glycerin, polybasic acids, for example phthalic anhydride, and fatty acids of drying, semi-drying, or non-drying oils. Various proportions of these ingredients have been reacted together in an open or closed vessel to produce drying oil modified alkyd resins. Another method of making alkyd resins comprises reacting polyhydric alcohols, polybasic acids and vegetable oils under heat and pressure in a closed container so as to bring about the breaking down of the oil into fatty acids and glyceride constituents and combining the same with polyhydric alcohol and polybasic acid to produce an alkyd resinous composition. These resins have been used in preparing coating compositions but they do not produce a composition having marked adhesive properties and toughness.

I have discovered that vegetable oil modified polyhydric alcohol-polybasic acid resins of the type indicated hereinafter can be produced with the use of raw castor oil as the oil modifying agent by suitably condensing the same with phthalic anhydride, glycerine in the presence of a dehydrating agent, such as sodium acetate. The discovery that a drying resin could be made with the use of large amounts of raw castor oil was unexpected since, due to the well-known non-drying properties of castor oil and similar hydroxylated vegetable oils, the use of large amounts of this oil as a constituent ordinarily produces a non-drying or semi-drying composition.

Further, it has been the conventional practice to utilize dehydrated castor oil or preheated, oxidized, or blown castor oil as a modifying agent rather than the raw untreated castor oil. I have discovered, however, that this is not necessary and that the raw castor oil may be employed and made to react with the polyhydric alcohol and polybasic acid constituents so as to form a resinous condensation product which will possess the property of drying to a tough, resilient, adherent film when applied as a coating.

It is, accordingly, an object of this invention to produce new and useful oil modified polyhydric alcohol-polybasic acid resins.

Another object is to produce a tough, adherent alkyd resin utilizing raw castor oil as the oil modified agent in lieu of dehydrated castor oil whereby drying alkyd resin is produced.

Another object is to produce modified polyhydric alcohol-polybasic acid resins which produce films that are tougher and more adherent to the base on which it is applied as a coating than has heretofore been produced.

It is another object of my invention to produce an alkyd resin modified with non-drying vegetable oil which provides a synthetic resin which is very light in color and which when thinned with solvent, applied to metal and baked produces a tough, hard, highly adhesive coating film possessing exceptionally good flexibility.

These and other objects and advantages will be apparent from the following description in which I have included examples by way of illustration and not as a limitation.

A typical example of the method of making my alkyd resin according to this invention is as follows:

Example I

| | Parts by weight |
|---|---|
| Castor oil | 12.75 |
| Phthalic anhydride | 15.00 |
| Glycerin | 7.50 |
| Sodium acetate | 0.25 |

The castor oil, acetate and glycerin are heated together to a temperature of around 525 degrees F., then cooled to 300 degrees F. at which temperature the phthalic anhydride is introduced. The mixture is then heated to 450 degrees F. and held there for approximately 30 minutes. After this time the mixture is allowed to cool producing a very viscous, light colored resin.

The sodium acetate acts as a dehydrating agent on both the glycerin and the oil changing the castor oil to a drying oil and functions as a condensing catalyst with the acids, alcohols and fatty oil to produce the clear resinous product which dries to a slight tack when mixed with thinner.

As another example, the following is given:

Example II

| | Parts by weight |
|---|---|
| Castor oil (raw or refined) | 13.00–15.00 |
| Phthalic anhydride | 14.00–16.00 |
| Glycerin | 7.00– 8.50 |
| Sodium acetate | 0.20– 0.30 |

The oil, glycerin and acetate are heated in an open kettle to 525 degrees F. The mix is then allowed to cool to 300 degrees F. and the phthalic anhydride introduced. Thereafter, the mixture is heated to 450 degrees F. and held there for approximately 30 minutes. The resinous mix is then allowed to cool giving a very viscous light colored resin.

In the heat treatment, as described, it was observed that at 400 degrees F. the mixture was clear and transparent showing that the constituent ingredients had been combined at this temperature. The yield of the resin in both Examples I and II is approximately 90% based on the initial ingredients. The oil content calculated without allowing for any loss in the resinous product approximates 35% to 38% and the sodium acetate approximates 2% to 2½% of the oil. It is understood that the proportionate ingredients may be varied to some extent in order to produce modified resinous compositions.

A 60% solution by weight of the above resin made according to Examples I and II, when dissolved in xylol and coated on metal panels and baked at 200 degrees F. to 250 degrees F. for one hour, forms a very light colored, glossy coating. The resultant coating exhibits a hard, tough, highly adherent film having a very slight tack. By incorporating pigment in this oil modified resinous vehicle, the tack is eliminated and a tough, adherent enamel is produced having high flexibility. Further, by incorporating driers, such as cobalt acetate, linoleate and the like, a faster drying film is produced.

In place of castor oil, other oils may be used, such as varnish linseed, heat bodied linseed, crude oiticica and soy bean oil. All of these oils produce similar alkyd resins but the castor oil modified alkyd resin possesses the most outstanding properties with regard to adhesion, flexibility and toughness. With the use of soy bean and oiticica oils in making the above alkyd resin and drying the same, a slight wrinkled finish was produced. This would indicate that with the use of oils having conjugated double bond structural linkage, such as tung, oiticica and like vegetable drying oils, a wrinkle drying composition may be produced.

The color of the resin varies according to the oil used but the resin produced is always light colored.

In place of sodium acetate other acetates may be used, such as potassium, calcium and similar alkali metal substances. Other compounds which act as a dehydrating agent may be utilized but I prefer to use sodium acetate.

My method provides a novel process of manufacturing a very pale alkyd resin from raw castor oil which will dry when applied as a film and produce a tough, highly adhesive coating. Use has been made heretofore of dehydrated castor oil but my method offsets the use of the more expensive dehydrated oil product and the raw castor oil can be employed which is dehydrated in situ during the heat treatment. Where it is desired to produce a fast surface drying wrinkle finish there may be incorporated in the above composition a sufficient amount of cobalt drier or similar surface active drier composition which will bring about accelerated surface drying of the film to produce a wrinkle finish. Further, textural wrinkle modified substances, such as asbestine, drying oil fatty acids and the like may be added to produce the desired texture of the wrinkle finish.

In place of glycerin other polyhydric alcohols may be used, such as glycols, polyglycerols, pentaerythritol, sorbitol, mannitol and glycol ethers. As a substitute for raw castor oil, other hydroxylated non-drying oils may be used to produce a modified resinous composition. In place of phthalic acid anhydride other aromatic polybasic acids may be used. When using aliphatic dibasic acids, such as malic, maleic, fumaric, succinic, it is very difficult to control the reaction and to cool the mass after the heat treatment fast enough to prevent the formation of an insoluble resinous product. With phthalic anhydride, however, this difficulty is not encountered and I prefer to use this compound in making the castor oil modified alkyd resin of my invention.

It will be understood that my invention is not limited to the specific examples given and that the method and proportionate amount of ingredients may be varied to produce modified products as required for different conditions and uses.

Having thus fully described my invention, what I claim as new and desire to secure by Letters Patent is:

1. A process for making an oil modified alkyd resin, including the steps of simultaneously reacting castor oil, glycerin and sodium acetate at a temperature of substantially 525° F., cooling the mixture to about 300° F., adding polycarboxylic acids, reheating to about 450° F. and holding the mixture at 450° F. for about 30 minutes.

2. A process for making an oil modified alkyd resin, including the steps of simultaneously reacting castor oil, polyhydric alcohols and sodium acetate at a temperature of substantially 525° F., cooling the mixture to about 300° F., adding phthalic anhydride, reheating to about 450° F. and holding the mixture at 450° F. for about 30 minutes.

3. A process for making an oil modified alkyd resin, including the steps of simultaneously reacting 12.75 parts by weight of castor oil, 7.50 parts by weight of glycerin, 0.25 part by weight of sodium acetate at a temperature of substantially 525° F., cooling the mixture to about 300° F., adding 15.00 parts by weight of phthalic anhydride, reheating to about 450° F. and holding the mixture at 450° F. for about 30 minutes.

4. A process for making an oil modified alkyd resin including the steps of simultaneously reacting 13.00 to 15.00 parts by weight of castor oil, 7.00 to 8.50 parts by weight of glycerin, 0.20 to 0.30 part by weight of sodium acetate, heating the mixture to substantially 525° F., cooling the mixture to about 300° F., adding 14.00 to 16.00 parts by weight of phthalic anhydride, and finally heating the mixture to about 450° F. and holding at this temperature for about 30 minutes.

5. A process for making an oil modified alkyd resin, including the steps of simultaneously reacting hydroxylated non-drying oils, polyhydric alcohols and sodium acetate at a temperature of substantially 525° F., cooling the mixture to about 300° F., adding phthalic anhydride, reheating to about 450° F. and holding the mixture at 450° F. for about 30 minutes.

WILLIAM A. WALDIE.